(12) United States Patent
Ogasawara

(10) Patent No.: US 10,631,034 B2
(45) Date of Patent: Apr. 21, 2020

(54) IN-VEHICLE BROADCAST RECEPTION APPARATUS

(71) Applicant: DENSO CORPORATION, Kariya, Aichi-pref. (JP)

(72) Inventor: Akihiro Ogasawara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/093,983

(22) PCT Filed: Feb. 27, 2017

(86) PCT No.: PCT/JP2017/007425
§ 371 (c)(1),
(2) Date: Oct. 16, 2018

(87) PCT Pub. No.: WO2017/183303
PCT Pub. Date: Oct. 26, 2017

(65) Prior Publication Data
US 2019/0124385 A1    Apr. 25, 2019

(30) Foreign Application Priority Data

Apr. 18, 2016 (JP) ................................. 2016-082859

(51) Int. Cl.
*H04N 21/414* (2011.01)
*H04H 60/46* (2008.01)
(Continued)

(52) U.S. Cl.
CPC ...... *H04N 21/41422* (2013.01); *H04H 60/46* (2013.01); *H04N 21/438* (2013.01);
(Continued)

(58) Field of Classification Search
CPC .......... H04N 21/41422; H04N 21/438; H04N 21/44213; H04N 21/466
(Continued)

(56) References Cited

U.S. PATENT DOCUMENTS

2012/0042349 A1* 2/2012 Ng .................... H04N 21/41407
                                                           725/109
2013/0165164 A1* 6/2013 Rowe ................. H04N 21/4126
                                                           455/466
(Continued)

FOREIGN PATENT DOCUMENTS

EP    2265017 A1 * 12/2010 ............ H03J 1/0075
JP    2007043355 A    2/2007
(Continued)

*Primary Examiner* — Joshua D Taylor
(74) *Attorney, Agent, or Firm* — Harness, Dickey & Pierce, P.L.C.

(57) ABSTRACT

An in-vehicle broadcast reception apparatus includes the following. A viewing or listening determiner section determining whether a relay broadcasting of a sports game is viewed or listened to via a first broadcast. A team determiner section determining whether a team in the sports game is a team of interest to a user among a plurality of teams. A retriever section retrieving a second broadcast that performs a relay broadcasting of a sports game which is identical to the relay broadcasting of the sports game viewed or listened to via the first broadcast. A switcher section switching to the second broadcast to enable continued viewing or listening of the sports game when the relay broadcasting of the sports game via the first broadcast is ended, in response to that the team in the sports game is determined to be the team of interest to the user.

10 Claims, 6 Drawing Sheets

(51) Int. Cl.
*H04N 21/438* (2011.01)
*H04N 21/466* (2011.01)
*H04N 21/442* (2011.01)
*H04H 60/11* (2008.01)
*H04H 20/62* (2008.01)

(52) U.S. Cl.
CPC ..... *H04N 21/44213* (2013.01); *H04N 21/466* (2013.01); *H04H 20/62* (2013.01); *H04H 60/11* (2013.01)

(58) Field of Classification Search
USPC ........................................................ 725/131
See application file for complete search history.

(56) References Cited

U.S. PATENT DOCUMENTS

2014/0106331 A1* 4/2014 Mitalski .................. G09B 5/08
434/350
2015/0324466 A1* 11/2015 Dau ........................ H04L 67/28
707/734

FOREIGN PATENT DOCUMENTS

| JP | 2007243903 A | 9/2007 |
| JP | 2007258871 A | 10/2007 |
| WO | WO-2009128121 A1 | 10/2009 |

\* cited by examiner

FIG. 3

| | ACCUMULATIVE VIEWING OR LISTENING COUNT | ACCUMULATIVE VIEWING OR LISTENING PERIOD OF TIME | AVERAGE VIEWING OR LISTENING PERIOD OF TIME |
|---|---|---|---|
| KYOJIN | 10 | 40 | 4.0 |
| CHU-NICHI | 20 | 60 | 3.0 |
| HIROSHIMA | 13 | 20 | 1.5 |
| YAKULT | 15 | 5 | 0.3 |
| HANSHIN | 8 | 8 | 1.0 |
| DeNA | 5 | 4 | 0.8 |
| SEIBU | 2 | 2 | 1.0 |
| LOTTE | 2 | 1 | 0.5 |
| NIHON-HAM | 1 | 2 | 2.0 |
| SOFTBANK | 0 | 0 | 0.0 |
| ORIX | 3 | 5 | 1.7 |
| RAKUTEN | 2 | 4 | 2.0 |

| BROADCAST STATION | CH/ FREQUENCY | TEAM 1 | TEAM 2 | START TIME | END TIME | MAX EXTENDED TIME |
|---|---|---|---|---|---|---|
| FUJI TV | 8 | YAKULT | HANSHIN | 19:00 | 21:00 | 60 MIN |
| NIPPON TV | 4 | KYOJIN | CHU-NICHI | 19:00 | 21:00 | 60 MIN |
| NIPPON BROADCAST | 1242kHz | YAKULT | HANSHIN | 18:00 | 22:00 | NOT LIMITED |
| TBS RADIO | 942kHz | KYOJIN | CHU-NICHI | 18:00 | 22:00 | NOT LIMITED |
| BUNKA BROADCAST | 1143kHz | HIROSHIMA | DeNA | 18:00 | 22:00 | NOT LIMITED |

36

IN-VEHICLE BROADCAST RECEPTION APPARATUS

CROSS REFERENCE TO RELATED APPLICATIONS

This application is a U.S. National Phase Application under 35 U.S.C. 371 of International Application No. PCT/JP2017/007425 filed on Feb. 27, 2017. This application is based on and claims the benefit of priority from Japanese Patent Application No. 2016-082859 filed on Apr. 18, 2016. The entire disclosures of all of the above applications are incorporated herein by reference.

TECHNICAL FIELD

The present disclosure relates to an in-vehicle broadcast reception apparatus which receives a television broadcast or a radio broadcast.

BACKGROUND ART

Patent literatures 1, 2 each describe a configuration in which after a relay broadcasting of a baseball game via a television broadcast is ended, a radio broadcast or an Internet broadcast takes over automatically the relay broadcasting of the baseball game from the television broadcast. Such a configuration enables the relay broadcasting of the baseball game to be automatically continued via a radio broadcast etc., thereby providing a user who wants to view or listen to the relay broadcasting of the baseball game with usability.

PRIOR ART LITERATURES

Patent Literature

Patent literature 1: JP 2007-258871 A
Patent literature 2: JP 2007-243903 A

SUMMARY OF INVENTION

In the above conventional configuration, suppose a case where after the relay broadcasting of the baseball game is ended, the user does not want to view any specific program or the user wants to view a different television program. In such a case, if a radio broadcast or the like takes over the relay broadcasting of the baseball game automatically from the television broadcast, the user does not feel it convenient.

It is an object of the present disclosure to provide an in-vehicle broadcast reception apparatus which is enabled to execute measures in considering an intention of a user in cases that a relay broadcasting of a baseball game or the like is ended halfway. According to a first example of the present disclosure, an in-vehicle broadcast reception apparatus in a vehicle is provided to be enabled to receive a plurality of broadcasts. The in-vehicle broadcast reception apparatus includes the following. A viewing or listening determiner section is configured to determine whether a relay broadcasting of a sports game is being viewed or listened to via a first broadcast. A team determiner section is configured to determine whether a team participating in the sports game of which the relay broadcasting is viewed or listened to via the first broadcast is a team of interest to a user among a plurality of teams. A retriever section is configured to retrieve a second broadcast that performs a relay broadcasting of a sports game which is identical to the relay broadcasting of the sports game which is being viewed or listened to via the first broadcast. A switcher section is configured to switch to the second broadcast to enable continued viewing or listening of the sports game when the relay broadcasting of the sports game via the first broadcast is ended, in response to that the team participating in the sports game is determined to be the team of interest to the user.

According to a second example of the present disclosure, an in-vehicle broadcast reception apparatus in a vehicle is provided to be enabled to receive a plurality of broadcasts. The in-vehicle broadcast reception apparatus includes the following: a broadcasting station retriever section configured to retrieve a first broadcasting station that performs a relay broadcasting of a sports game of a team of interest to a user; and a station selector section configured to select the first broadcasting station when the relay broadcasting of the sports game of the team of interest to the user is started via the first broadcasting station.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating data contents on viewing or listening baseball team database;

FIG. 6 is a diagram illustrating data contents in a data list of relay broadcasting of professional baseball games.

EMBODIMENTS FOR CARRYING OUT INVENTION

First Embodiment

Figure 1:
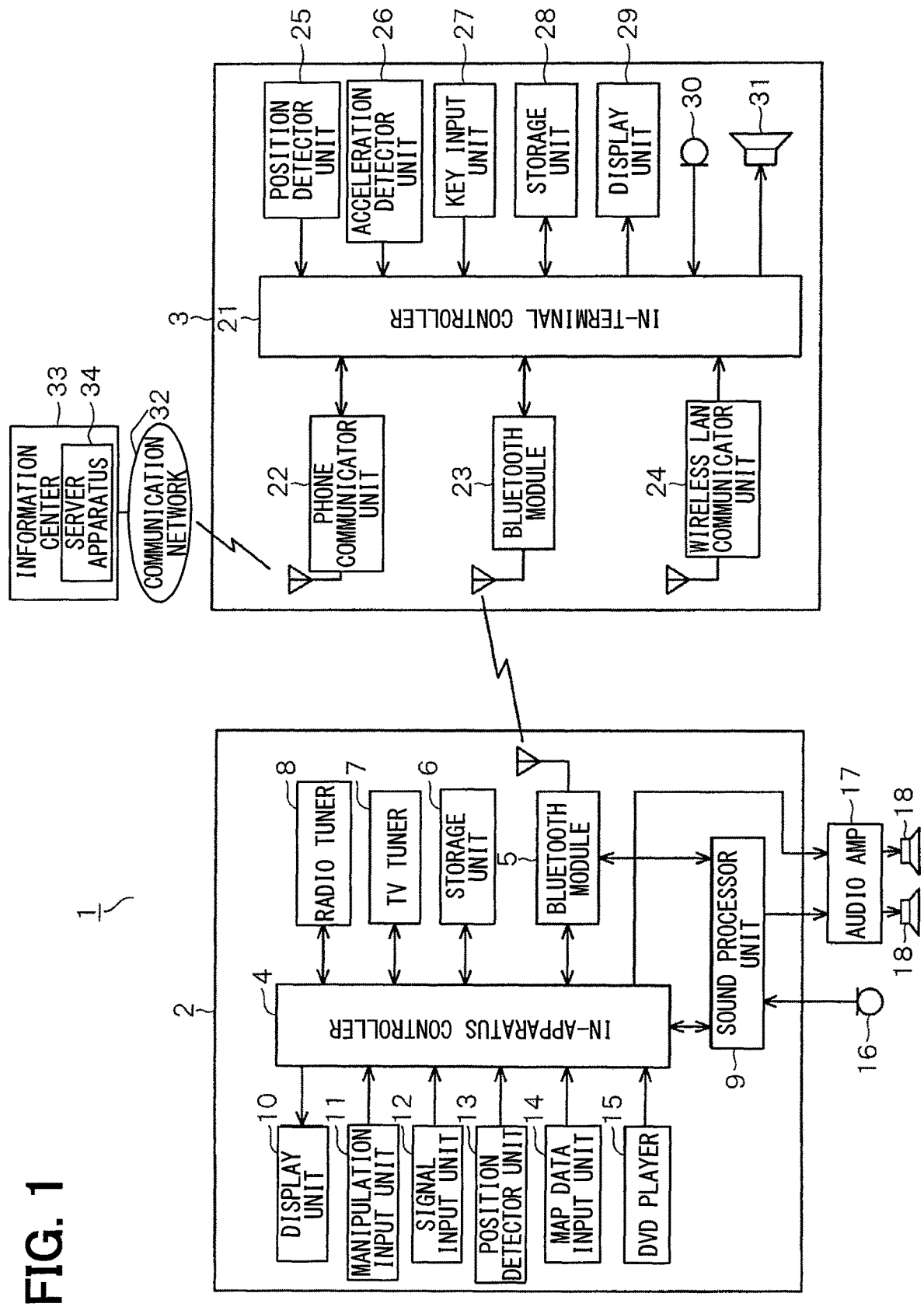
FIG. 1 is a block diagram of an in-vehicle audio system according to a first embodiment.
Figure 2:
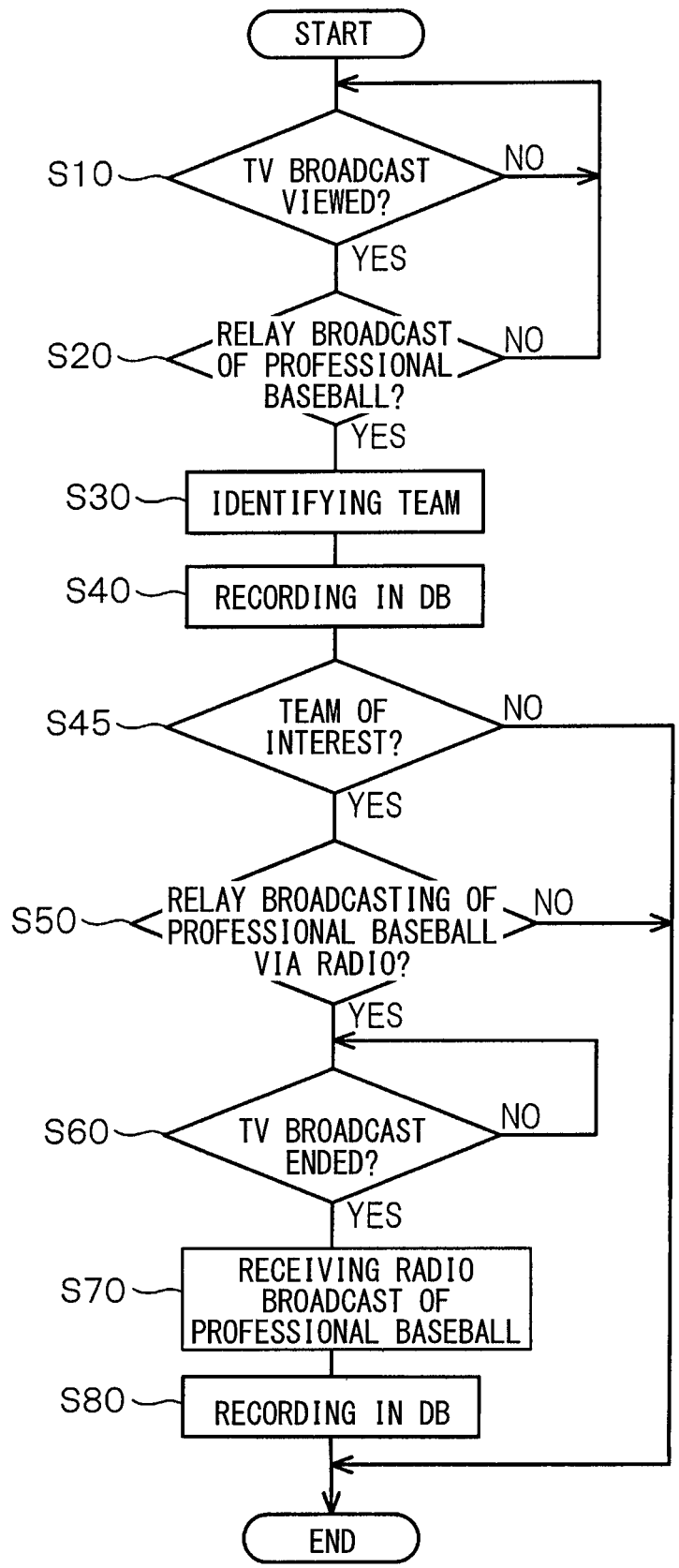
FIG. 2 is a flowchart of a broadcast viewing or listening control.

The following explains an in-vehicle audio system according to a first embodiment with reference to FIG. 1 to FIG. 3. The in-vehicle audio system 1 according to the present embodiment includes a vehicular apparatus 2 and a portable terminal 3, as illustrated in FIG. 1. The in-vehicle audio system 1 is included in an in-vehicle broadcast reception apparatus. The present embodiment supposes the vehicular apparatus 2 as a navigation apparatus mounted in a vehicle. The portable terminal 3 is supposed as a smart phone brought into a vehicle compartment of the vehicle.

In addition, the in-vehicle audio system 1 performs data communication between the vehicular apparatus 2 and the portable terminal 3. The data communication is performed with a short range wireless communication such as Bluetooth (registered trademark), for example. The following explanation refers Bluetooth only as BT.

The vehicular apparatus 2 includes an in-apparatus controller 4, a BT module 5, a storage unit 6, a television (i.e., TV) tuner 7, a radio tuner 8, a sound processor unit 9, a display unit 10, a manipulation input unit 11, a signal input unit 12, a position detector unit 13, a map data input unit 14, and a DVD player 15. The in-apparatus controller 4 includes a microcomputer containing a CPU, RAM, ROM, and I/O bus. The in-apparatus controller 4 controls an overall operation of the vehicular apparatus 2, such as a communication operation, a data management operation, and a coordinated operation with the portable terminal 3, according to a computer program stored in the ROM or the storage unit 6.

The in-apparatus controller 4 includes a route retrieving function which retrieves a route from a current position of the vehicle to a destination, a route guidance function which performs a route guidance in line with a route that is retrieved and designated, and a destination designation function to designate a destination by manipulating the manipulation input unit 11. Furthermore, the in-apparatus controller 4 is configured to be enabled to receive an intended TV broadcast or an intended radio broadcast via the TV tuner 7 or the radio tuner 8, respectively. The in-apparatus controller 4 includes functions as a viewing or listening determiner section, a team determiner section, a retriever section, and a switcher section. In the present embodiment, the TV broadcast is equivalent to a first broadcast, and the radio broadcast is equivalent to a second broadcast.

The BT module 5 performs a BT communication with the BT module 23 of the portable terminal 3 via a BT communication link. The vehicular apparatus 2 is enabled to perform not only the data communication (BT communication) with one portable terminal 3 but also the data communication (BT communication) with a plurality (two or more) of portable terminals 3.

The storage unit 6, which is configured to be a non-volatile storage medium such as a hard disk drive or an SD memory, for example, includes a storage region for storing the various data. The storage unit 6 may be configured to be built in the vehicular apparatus 2, or may be configured to employ an external storage medium detachable from the vehicular apparatus 2.

The TV tuner 7 includes a function to receive a TV broadcast of a TV broadcasting station indicated by the in-apparatus controller 4, and outputs a reception signal of the TV broadcast to the in-apparatus controller 4. The reception signal of the TV broadcast includes a video signal, an audio signal (that is, AV signal), and an information signal containing the various information such as a TV program list. When the user views and listens to the TV broadcast, the in-apparatus controller 4 displays the video signal of the TV broadcast in the display unit 10, and outputs the audio signal of the TV broadcast from a speaker 18 via an audio amplifier 17. The TV tuner 7 may be a configured to be built in the vehicular apparatus 2, may be configured to be detachable from the vehicular apparatus 2, or may be configured to be external.

The radio tuner 8 includes a function to receive a radio broadcast of a radio broadcasting station indicated by the in-apparatus controller 4, and outputs a reception signal of the radio broadcast to the in-apparatus controller 4. The reception signal of the radio broadcast contains an audio signal (that is, AV signal). When the user listens to the radio broadcast, the in-apparatus controller 4 outputs the audio signal of the radio broadcast from the speaker 18 via the audio amplifier 17. The radio tuner 8 may be a configured to be built in the vehicular apparatus 2, may be configured to be detachable from the vehicular apparatus 2, or may be configured to be external.

The sound processor unit 9 is connected with a microphone 16 and the audio amplifier 17. The microphone 16 is arranged at a position in the vehicle compartment to easily collect a speech uttered by a user (e.g., a driver), like near the steering wheel. The audio amplifier 17 is provided to be separate from the vehicular apparatus 2 in the vehicle compartment. The audio amplifier 17 is connected with the speaker 18. The sound processor unit 9 is connected with the in-apparatus controller 4 and the BT module 5. The sound processor unit 9 performs a well-known sound input process and sound output process. Under the state where the BT communication link is connected between the BT module 5 and the BT module 23 of the portable terminal 3, upon receiving e speech uttered by the user as a transmission sound data from the microphone 16, the sound processor unit 9 applies the speech processing to the received transmission sound data to output to the portable terminal 3 via the BT module 5, whereas upon receiving a reception speech data from the BT module 5, the sound processor unit 9 outputs the received reception speech data to the audio amplifier 17. Upon receiving a reception speech data or sound data from the sound processor unit 9, the audio amplifier 17 amplifies the reception speech data and the sound data to output via the speaker 18.

Furthermore, the audio amplifier 17 is connected with the in-apparatus controller 4. Upon receiving the sound of the TV broadcast, the sound of the radio broadcast, the composition data, the sound data, or the speech data from the in-apparatus controller 4, the audio amplifier 17 amplifies the sound of the TV broadcast, the sound of the radio broadcast, the composition data, the sound data, or the speech data, which are received, to output the amplified ones from the speaker 18.

The display unit 10 is configured to be a liquid crystal display or an organic electroluminescence display. The display unit 10 displays the various kinds of information (for example, the images of the TV broadcast, the various kinds of messages, the various kinds of displays about navigation) based on the instruction from the in-apparatus controller 4. The display unit 10 has a screen on which a touch switch (for example, touch panel) is provided.

The manipulation input unit 11 includes a touch switch and a mechanical switch provided in a periphery of the display unit 10, and detects a manipulation to the switch by the user, to output a manipulation detection signal to the in-apparatus controller 4. The in-apparatus controller 4 analyzes the manipulation detection signal inputted from the manipulation input unit 11, and identifies the manipulation content by the user.

The signal input unit 12 is connected with an ACC (accessories) switch (unshown) mounted in the vehicle. Upon receiving the ACC signal outputted from the above ACC switch, the signal input unit 12 outputs the ACC signal to the in-apparatus controller 4. The in-apparatus controller 4 turns on the apparatus power (starts the vehicular apparatus 2) when the ACC signal transitions from OFF state to ON state, and turns off the apparatus power (stops the vehicular apparatus 2) when the ACC signal transitions from ON state to OFF state.

The position detector unit 13 includes known sensors (none-shown) such as a geomagnetic sensor, a gyroscope, a speed sensor, and a GPS receiver, detecting a current position of the vehicle with a high precision. Furthermore, an acceleration sensor to detect an acceleration may be added. The position detector unit 13 outputs the information on the detected current position of the vehicle to the in-apparatus controller 4. The in-apparatus controller 4 performs a so-called navigation process based on the information on the current position of the vehicle from the position detector unit 13. The map data input unit 14 uses a large data volume storage medium such as a CD-ROM, a DVD-ROM, a hard disk, or a non-volatile semiconductor memory, and inputs road map data etc. The DVD player 15 reproduces a DVD or a CD, etc. and outputs the video signal and the audio signal (that is, AV signal) to the in-apparatus controller 4.

In contrast, the portable terminal 3 includes an in-terminal controller 21, a telephone communicator unit 22, a BT module 23, a wireless LAN communicator unit 24, a position detector unit 25, an acceleration detector unit 26, a key input unit 27, a storage unit 28, a display unit 29, a microphone 30, and a speaker 31. The in-terminal controller 21 includes a microcomputer containing a CPU, RAM, ROM, and I/O bus. The in-terminal controller 21 controls an overall operation of the portable terminals 3, such as a communication operation, a data management operation. The in-terminal controller 21 starts an application stored in the storage unit 28 to cooperate with the vehicular apparatus 2, and achieves a function as an information acquirer section to acquire the information on the program list of a radio broadcast.

The telephone communicator unit 22 performs the telephone communication or the data communication with the communication network 32. In this case, the communication network 32 includes a facility, which provides a known cellular phone communication service using public communication network such as a wireless base station, a base station control apparatus (none-shown). The portable terminal 3 is enabled to perform the telephone communication or the data communication with other portable terminals 2 (smart phone, portable phone, tablet, etc.), via the telephone communicator unit 22 and the communication network 32. In addition, the portable terminal 3 is enabled to acquire (i.e., download) the various information (in particular, the information on the program list of the radio broadcast) or the applications from the server apparatus 34 in the information center 33 via the telephone communicator unit 22 and the communication network 32.

The BT module 23 performs a BT communication with the BT module 5 of the vehicular apparatus 2 via a BT communication link. The wireless LAN communicator unit 24 performs a wireless LAN communication with wireless LAN communicator units of other electrical apparatuses (for example, a vehicle CAN or a wearable device which a driver puts on) via the wireless LAN communication link. The position detector unit 25, which is configured to be a GPS receiver, detects a current position of the portable terminal 3 and transmits the information on the detected current position to the in-terminal controller 21. The acceleration detector unit 26, which is configured to be a G sensor, detects an acceleration exerted on the portable terminal 3 and transmits the information on the detected acceleration to the in-terminal controller 21.

The display unit 29, which may be configured to be a liquid crystal display, an organic electroluminescence display, displays the various kinds of information based on a display instruction signal of the in-terminal controller 21. The key input unit 27 includes the various kinds of keys which include (i) a touch switch (so-called touch panel) arranged on a screen of the display unit 29, and (ii) a mechanical switch arranged in the periphery of the display unit 29. The key input unit 27 outputs a manipulation detection signal to the in-terminal controller 21 according to the user having manipulated the key.

The storage unit 28, which may be configured to be an EEPROM, a flash memory, or an SD memory, includes a storage region which stores the various data. The microphone 30 receives, as a transmission sound, a speech uttered by the user at a phone call. The speaker 31 outputs, as a reception sound, a sound signal received by the telephone communicator unit 22 from a call partner.

The following will explain an operation of the in-vehicle audio system 1 having the above configuration with reference to FIGS. 2, 3. The flowchart in FIG. 2 illustrates the control of the in-apparatus controller 4 of the vehicular apparatus 2, in particular, the broadcast viewing or listening control which views or listens to a TV broadcast or a radio broadcast. It is noted that before the start of the present control, the user already views or listens to a TV broadcast; that is, the image of the TV broadcast is displayed in the display unit 10 and the sound of the TV broadcast is outputted from the speaker 18.

First, at Step S10 in FIG. 2, the in-apparatus controller 4 determines whether a TV broadcast is viewed or listened to. When a TV broadcast is not viewed or listened to (Step S10: NO), the sequence returns to Step S10. When a TV broadcast is viewed or listened to (Step S10: YES), the sequence proceeds to Step S20, where it is determined whether the TV broadcast which is viewed or listened to is a relay broadcasting of a professional baseball game. When the TV broadcast which is viewed or listened to is not a relay broadcasting of a professional baseball game (Step S20: NO), the sequence returns to Step S10.

In addition, when the TV broadcast which is viewed or listened to is a relay broadcasting of a professional baseball game (Step S20: YES), the sequence proceeds to Step S30. At S30, the in-apparatus controller 4 identifies the names of the professional baseball teams (that is, two professional baseball teams) participating in the professional baseball game of which the relay broadcasting is viewed or listened to, based on the information on the TV program list included in the reception signal of the TV broadcast (for example, data of G-Guide).

The sequence then proceeds to Step S40, where the in-apparatus controller 4 records the viewing or listening information about the identified professional baseball teams in the viewing or listening baseball team database 35 illustrated in FIG. 3. The viewing or listening baseball team database 35, which is provided in the storage unit 6 or a memory in the in-apparatus controller 4, stores the data of an accumulative viewing or listening count, the data of an accumulative viewing or listening period of time, and the data of an average viewing or listening period of time, with respect to each of the professional baseball teams. At Step S40, with respect to each of the identified baseball teams in the viewing or listening baseball team database, the accumulative viewing or listening count is incremented, the accumulative viewing or listening period of time is increased, and the average viewing or listening period of time is re-calculated.

Subsequently, the sequence proceeds to Step S45, where the in-apparatus controller 4 determines whether each of the identified baseball teams is a professional baseball team of interest to the user. In this case, the in-apparatus controller 4 identifies the professional baseball team of interest to the user based on the above viewing or listening baseball team database 35. For example, the team having the longest accumulative viewing or listening period of time is determined to be a team of interest to the user. In the viewing or listening baseball team database 35 in FIG. 3, "Chu-nichi" is regarded as the professional baseball team of interest to the user. When each of the identified baseball teams is determined not to be the professional baseball team of interest to the user (Step S45: NO), the present control is ended.

In contrast, when one of the identified baseball teams is determined to be the professional baseball team of interest to the user (Step S45: YES), the sequence proceeds to Step S50, where the in-apparatus controller 4 determines whether a relay broadcasting of the professional baseball game being viewed or listened to via the TV broadcast is performed via a radio broadcast. In this case, the in-apparatus controller 4 transmits an instruction via the BT communication to the portable terminal 3 to acquire the information on the program list of the radio broadcast. Upon receiving the instruction, the in-terminal controller 21 of the portable terminal 3 accesses the server apparatus 34 in the information center 33 via the telephone communicator unit 22 and the communication network 32, acquires the information on the program list of the radio broadcast from this server apparatus 34, and transmits the acquired information on the program list of the radio broadcast to the vehicular apparatus 2 via the BT communication. Upon receiving the information on the program list of the radio broadcast, the in-apparatus controller 4 of the vehicular apparatus 2 searches the received information on the program list of the radio broadcast, determines whether the relay broadcasting of the professional baseball game being viewed or listened to via the TV broadcast is performed via a radio broadcast. When the relay broadcasting of the professional baseball game is determined not to be performed via a radio broadcast (Step S50: NO), the present control is ended.

When the relay broadcasting of the professional baseball game is determined to be performed via a radio broadcast (Step S50: YES), the sequence proceeds to S60, where it is determined whether the TV broadcast viewed or listened to (that is, the relay broadcasting of the professional baseball game) is ended. Such determination as to whether the broadcast is ended is made based on the information on the TV program list included in the reception signal of the TV broadcast, such as the broadcasting hours or broadcasting ending time of the relay broadcasting of the professional baseball game. When the TV broadcast of the relay broadcasting of the professional baseball game is determined not to be ended (Step S60: NO), the determination at Step S60 is repeated.

When the TV broadcast of the relay broadcasting of the professional baseball game is determined to be ended (Step S60: YES), the sequence proceeds to Step S70. At Step S70, the in-apparatus controller 4 outputs a channel selection instruction signal to the radio tuner 8 and adjusts the viewing or listening frequency of the radio tuner 8, so as to enable listening to the radio broadcast (that is, radio broadcast retrieved at Step S50) which performs a relay broadcasting of a professional baseball game identical to the relay broadcasting of the professional baseball game of which the relay broadcasting is viewed or listened to via the TV. This procedure allows the radio tuner 8 to receive the radio broadcast performing the relay broadcasting of the professional baseball game which is viewed or listened to via the TV. The received radio broadcast performing the relay broadcasting of the professional baseball game thereby comes to be outputted from the speaker 18 via the audio amplifier 17. As a result, the user is enabled to continuously listen to the relay broadcasting of the professional baseball game from via the TV broadcast to via the radio broadcast.

The sequence then proceeds to Step S80, where the in-apparatus controller 4 records the viewing or listening information of the professional baseball teams in the baseball game of which the relay broadcasting is viewed or listened to via the TV broadcast in the viewing or listening baseball team database 35. In this case, it is desirable to record the information (e.g., the number of automatic handovers of relay broadcastings) indicating that the relay broadcasting of the professional baseball game via the TV broadcast is automatically followed by the relay broadcast of the professional baseball game via the radio broadcast. The present control is then ended.

In the present embodiment having the above configuration, in cases that the professional baseball game of which the relay broadcasting is viewed or listened to via the TV broadcast is a baseball team of interest to the user, the radio broadcast performing the relay broadcasting of the professional baseball game takes over the relay broadcasting via the TV broadcast when the relay broadcasting via the TV broadcast is ended. According to such a configuration, in cases that the relay broadcasting via the TV of the professional baseball game of the professional baseball team of interest to the user is ended halfway, the relay broadcasting via the TV switches to the relay broadcasting via the radio automatically. This can provide the system with a sufficient usability in line with an intention of the user. In contrast, in cases that the relay broadcasting via the TV of the professional baseball game by the professional baseball team of not interest to the user is ended halfway, the TV broadcast continues to be received without the channel unchanged. This can provide the system with consideration for an intention of the user.

Further, in the above embodiment, the viewing or listening baseball team database 35 is configured to be updated when the relay broadcasting of a professional baseball game is viewed or listened to; thus, the viewing or listening baseball team database 35 can be accurately used to determine the professional baseball team of interest to the user.

Second Embodiment

Figure 4:
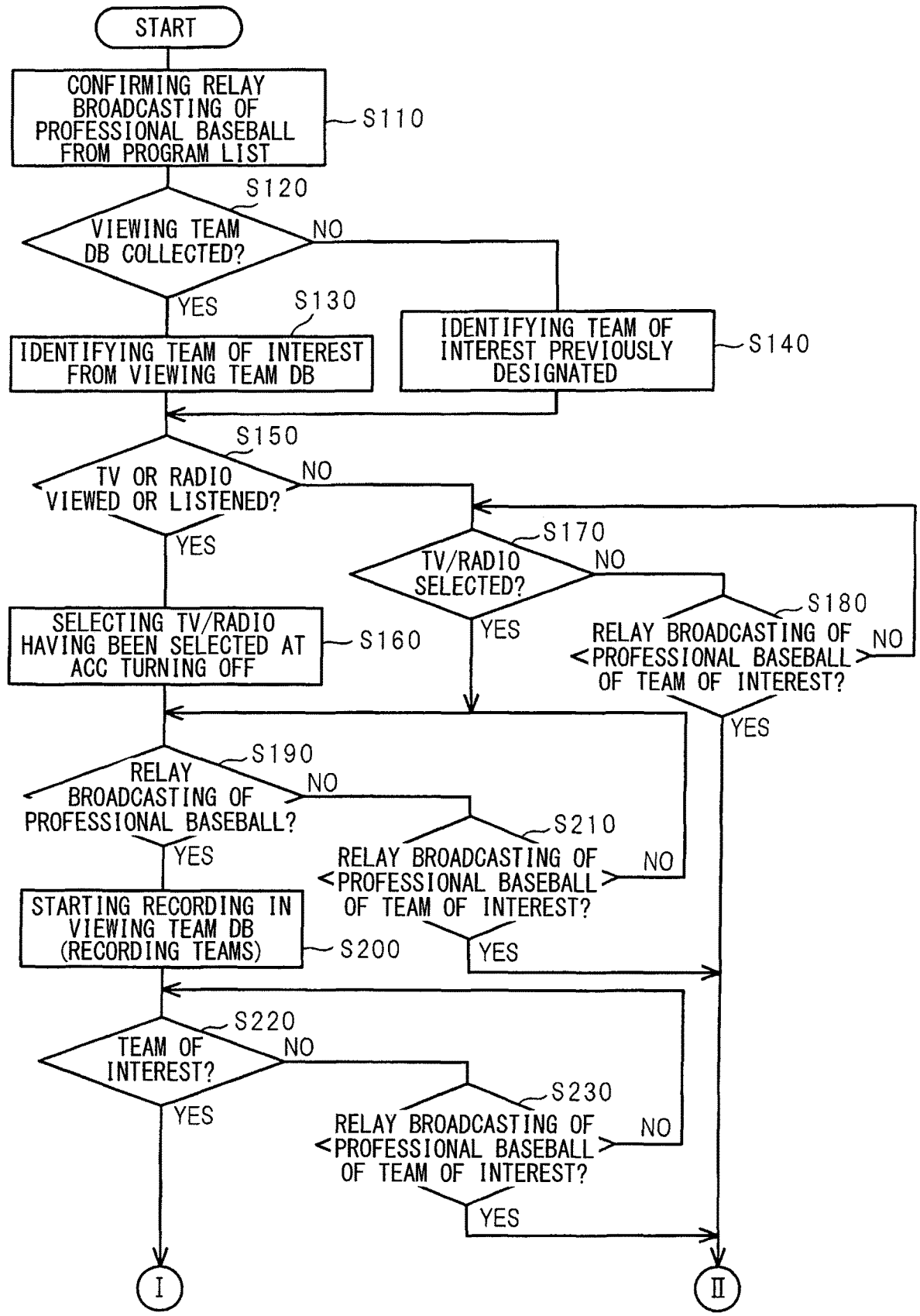
FIG. 4 is a flowchart (part 1) of a broadcast viewing or listening control according to a second embodiment.
Figure 5:
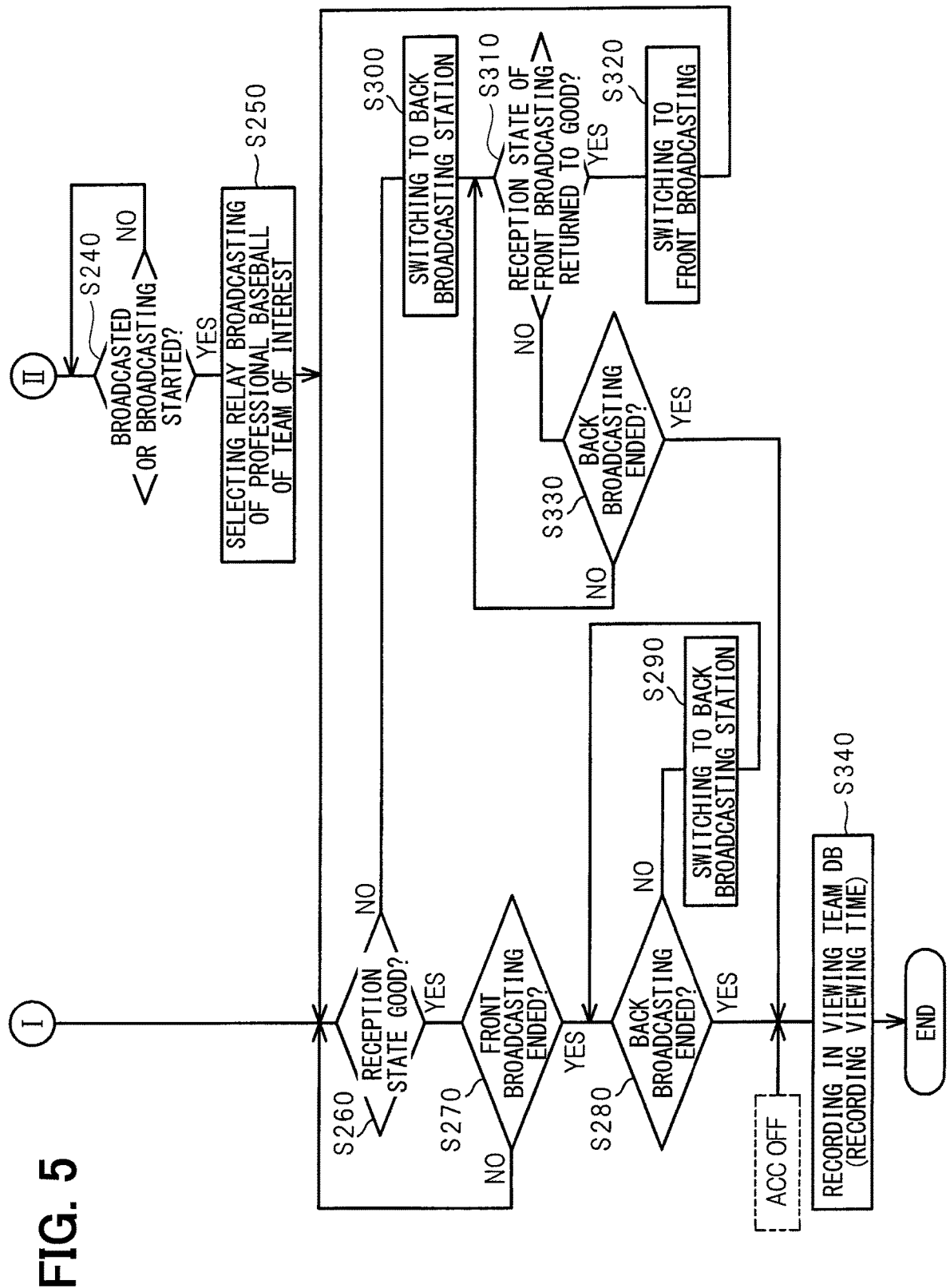
FIG. 5 is a flowchart (part 2) of the broadcast viewing or listening control.

FIG. 4 to FIG. 6 illustrate a second embodiment. It is noted that the same constituents of the configuration as those of the first embodiment are assigned respectively with the same reference signs or numbers. The second embodiment explains a broadcast viewing or listening control when an accessory (ACC) switch of the vehicle is turned into ON state. The flowcharts in FIG. 4 and FIG. 5 illustrate the contents of the broadcast viewing or listening control by the in-apparatus controller 4 when the ACC switch is turned into ON state. In the control in FIG. 4 and FIG. 5, the broadcasting station of the TV broadcast performing a relay broadcasting of a professional baseball game of a baseball team of interest is equivalent to a first broadcasting station; the broadcasting station of the radio broadcast performing a relay broadcasting of a professional baseball game of a baseball team of interest is equivalent to a second broadcasting station. In addition, the in-apparatus controller 4 includes respective functions as a broadcasting station retriever section and a station selector section.

At Step S110 in FIG. 4, the in-apparatus controller 4 confirms whether a TV broadcast or a radio broadcast performs a relay broadcasting of a professional baseball game, based on the information on TV program list included in the reception signal of the TV broadcast or the information on radio program list acquired from the server apparatus 34 via the portable terminal 3. When a TV broadcast or a radio broadcast is confirmed to perform a relay broadcasting of a professional baseball game, based on the information on TV program list or the information on radio program list, the in-apparatus controller 4 prepares a data list of TV or radio relay broadcasting of a professional baseball game (i.e., professional baseball relay broadcast data list 36), as in FIG. 6, and stores the prepared data list in an internal memory or the storage unit 6.

Then, the sequence proceeds to Step S120, where it is determined whether a record data is collected in the viewing or listening baseball team database 35 in FIG. 3. When a record data is collected in the viewing or listening baseball team database 35 (Step S120: YES), the sequence proceeds to Step S130, where the in-apparatus controller 4 identifies the professional baseball team of interest to the user based on the viewing or listening baseball team database 35. For example, the team having the longest accumulative viewing or listening period of time is determined to be a professional baseball team of interest to the user. In the viewing or listening baseball team database 35 in FIG. 3, "Chu-nichi" is regarded as the professional baseball team of interest to the user. In contrast, when a record data is not collected in the viewing or listening baseball team database 35 (Step S120: NO), the sequence proceeds to Step S140, where the in-apparatus controller 4 identifies the professional baseball team previously designated by the user as the professional baseball team of interest to the user.

The sequence proceeds to Step S150, where the in-apparatus controller 4 determines whether a TV broadcast or a radio broadcast is viewed or listened to just before the ACC switch is turned into OFF state based on the backup information when the ACC switch is turned into OFF state. When a TV broadcast or a radio broadcast is viewed or listened to just before the ACC switch is turned into OFF state (Step S150: YES), the sequence proceeds to Step S160, where the in-apparatus controller 4 selects the TV broadcast or the radio broadcast that is selected in when the ACC switch is turned into OFF state. This allows the TV broadcast or the radio broadcast selected when the ACC switch is turned into OFF state to be outputted from the speaker 18 via the audio amplifier 17, while allowing the image to be displayed in the display unit 10, if the TV broadcast is selected.

The sequence proceeds to Step S190, where it is determined whether the broadcast being currently viewed or listened to is a relay broadcasting of a professional baseball game. When the broadcast being currently viewed or listened to is a professional baseball game (Step S190: YES), the sequence proceeds to Step S200. At Step S200, the in-apparatus controller 4 starts recording of the viewing or listening information in the viewing or listening baseball team database 35, with respect to each of professional baseball teams (that is, two professional baseball teams) whose game is under the relay broadcasting.

The sequence proceeds to Step S220, where it is determined whether the professional baseball team under the relay broadcasting is the professional baseball team of interest to the user (i.e., the professional baseball team identified at Step S130). When the professional baseball team under the relay broadcasting is the professional baseball team of interest to the user (Step S220: YES), the sequence proceeds to Step S260 in FIG. 5, where it is determined whether the reception state of the broadcast that is viewed or listened to is good. The control after Step S260 (i.e., the control changing the broadcasts when the reception sensitivity is bad) will be mentioned later.

Now, when a TV broadcast or a radio broadcast is not viewed or listened to when the ACC switch is turned into OFF state (Step S150: NO) (i.e., a CD or a DVD is selected), the sequence proceeds to Step S170, where the in-apparatus controller 4 determines whether a TV broadcast or a radio broadcast is selected by the user. When a TV broadcast or a radio broadcast is not selected by the user (Step S170: NO), the sequence proceeds to Step S180, where the in-apparatus controller 4 whether a TV broadcast or a radio broadcast performs (i.e., is performing or is scheduled to perform) the relay broadcasting of the professional baseball game of the professional baseball team of interest to the user based on the professional baseball relay broadcast data list 36. When any broadcast does not perform the relay broadcasting of the professional baseball game of the professional baseball team of interest to the user (Step S180: NO), the sequence returns to Step S170, where the determination is repeated as to whether a TV broadcast or a radio broadcast is selected by the user.

In contrast, when a broadcast performs a relay broadcasting of a professional baseball game of the baseball team of interest to the user (Step S180: YES), the sequence proceeds to Step S240 in FIG. 5. At Step S240, it is determined whether a relay broadcasting of the professional baseball game is started (or whether a relay broadcasting of the professional baseball game is being performed). When a relay broadcasting of the professional baseball game is not started (Step S240: NO), the sequence returns to Step S240, where the start of the relay broadcasting of the professional baseball game is waited for.

In contrast, when a relay broadcasting of the professional baseball game is started or is being performed (Step S240: YES), the sequence proceeds to Step S250, where the in-apparatus controller 4 selects the TV broadcast or the radio broadcast that performs a relay broadcasting of the professional baseball game, i.e., automatically tuning into the channel of the TV broadcast or the frequency of the radio broadcast which performs a relay broadcasting of the professional baseball game. Thereby, the TV broadcast or the radio broadcast which performs the relay broadcasting of the professional baseball game of the professional baseball team of interest to the user is outputted from the speaker 18 via the audio amplifier 17, while the image is displayed in the display unit 10, if the TV broadcast is selected. In place of performing such automatic tuning or selection, other configurations may be provided. Another configuration may be provided which displays a message indicating that the TV broadcast or the radio broadcast of the relay broadcasting of the professional baseball game of the professional baseball team of interest to the user has been started in the display unit 10. Yet another configuration may be provided which outputs a speech that recommends the user to view or listen to the relay broadcasting of the professional baseball game from the speaker 18. After executing Step S250, the sequence proceeds to Step S260. The control after Step S260 is mentioned later.

In addition, when the TV broadcast or the radio broadcast is selected by the user (Step S170: YES), the in-apparatus controller 4 outputs the TV broadcast or the radio broadcast selected by the user from the speaker 18 via the audio amplifier 17, while the TV image is displayed in the display unit 10, if the TV broadcast is selected. The sequence then proceeds to Step S190. Thereafter, the control is performed as mentioned above.

In addition, when the broadcast which is viewed or listened to is not a relay broadcasting of a professional baseball game (Step S190: NO), the sequence proceeds to Step S210. At Step S210, the in-apparatus controller 4 determines whether a TV broadcast or a radio broadcast performs (i.e., is performing or is scheduled to perform) the relay broadcasting of the professional baseball game of the professional baseball team of interest to the user based on the professional baseball relay broadcast data list 36. When any broadcast does not perform the relay broadcasting of the professional baseball game of the professional baseball team of interest to the user (Step S210: NO), the sequence returns to Step S190, where the determination is repeated as to whether the broadcast being currently viewed or listened to is a relay broadcasting of a professional baseball game.

In addition, when a broadcast performs a relay broadcasting of a professional baseball game of the professional baseball team of interest to the user (Step S210: YES), the sequence proceeds to Step S240 in FIG. 5. At Step S240, it is determined whether a relay broadcasting of the professional baseball game is started, (or whether a relay broadcasting of the professional baseball game is being performed). Thereafter, the control is executed as mentioned above.

In addition, when the professional baseball team in the game under the relay broadcasting is not a baseball team of interest to the user (Step S220: NO), the sequence proceeds to Step S230. At Step S230, the in-apparatus controller 4 determines whether a TV broadcast or a radio broadcast performs (i.e., is performing or is scheduled to perform) the relay broadcasting of the professional baseball game of the professional baseball team of interest to the user based on the professional baseball relay broadcast data list 36. When any broadcast does not perform the relay broadcasting of the professional baseball game of the professional baseball team of interest to the user (Step S230: NO), the sequence returns to Step S220, where the determination is repeated as to whether the professional baseball team in the game under the relay broadcasting is the professional baseball team of interest to the user.

In addition, when a broadcast performs the relay broadcasting of a professional baseball game of the team of interest to the user (Step S230: YES), the sequence proceeds to Step S240 in FIG. 5. At Step S240, it is determined whether a relay broadcasting of the professional baseball game is started, (or whether a relay broadcasting of the professional baseball game is being performed). Thereafter, the control is executed as mentioned above.

The following explains the control after Step S260 in FIG. 5 (i.e., the control changing the broadcasts when the reception sensitivity is bad). First, at Step S260, the in-apparatus controller 4 determines whether the reception state of the broadcast under viewing or listening is good or bad. In this case, when the reception of the broadcast fails more than a designated period of time, for instance, more than one minute, the reception sensitivity in the broadcast is determined to be bad; when other cases take place, the reception sensitivity in the broadcast is determined to be good.

When the reception sensitivity in the broadcast is determined to be good (Step S260: YES), the sequence proceeds to Step S270, where the in-apparatus controller 4 determines whether the broadcast currently viewed or listened to by the user is ended (i.e., whether the relay broadcasting of the professional baseball game via the front broadcast that is a currently selected broadcast is ended). In this case, the relay broadcasting of the professional baseball game via the TV broadcast is assumed to be the front broadcast that is the currently selected broadcast; the relay broadcasting of the same professional baseball game via the radio broadcast is assumed to be the back broadcast that is a different competing broadcast in the same time-slot as that of the front broadcast that is the currently selected broadcast. When the relay broadcasting of the professional baseball game via the front broadcast that is the currently selected broadcast is not ended (Step S270: NO), the sequence returns to Step S260, where the determination is repeated as to whether the reception state of the broadcast being viewed or listened to is good.

In addition, when the relay broadcasting of the professional baseball game via the front broadcast that is the currently selected broadcast is ended (Step S270: YES), the sequence proceeds to Step S280, where the in-apparatus controller 4 determines whether the relay broadcasting of the professional baseball game via the radio broadcast is ended (i.e., whether the back broadcast that is a different competing broadcast in the same time-slot as that of the front broadcast is ended). When the back broadcast that is a different competing broadcast in the same time-slot as that of the front broadcast is not ended (Step S270: NO), the sequence proceeds to Step S290, where the in-apparatus controller 4 newly selects the back broadcast (i.e., tunes into the relay broadcasting of the professional baseball game via the radio broadcast). Thereby, the relay broadcasting of the professional baseball game is outputted from the speaker 18 via the audio amplifier 17. The sequence returns to Step S280, where the determination is repeated as to whether the back broadcast is ended (i.e., the relay broadcasting of the professional baseball game via the radio broadcast is ended).

When the back broadcast is ended (i.e., the relay broadcasting of the professional baseball game via the radio broadcast is ended) (Step S280: YES), the sequence proceeds to Step S340. At Step S340, the viewing or listening period of time for the professional baseball team participating the game in the professional baseball game of which the relay broadcasting is viewed or listened to (i.e., the period of time from the start to the end of the relay broadcasting of the professional baseball game) is recorded in the viewing or listening baseball team database 35. The present control is then ended.

When the reception sensitivity in the broadcast is determined to be bad (Step S260: NO), the sequence proceeds to Step S300, where the in-apparatus controller 4 newly selects the back broadcast that is a different competing broadcast in the same time-slot as that of the currently tuned broadcast (i.e., the relay broadcasting of the professional baseball game via the radio broadcast). Thereby, the relay broadcasting of the professional baseball game via the radio broadcast is outputted from the speaker 18 via the audio amplifier 17.

Then, the sequence proceeds to Step S310, where the in-apparatus controller 4 determines whether the reception state of the front broadcast, i.e., the TV broadcast, is recovered. In this case, when the broadcast comes to be received with stability about one minute, it is determined that the reception state of the broadcast is recovered. When the reception state of the front broadcast, i.e., the TV broadcast, is not recovered (Step S310: NO), the sequence proceeds to Step S330, where the in-apparatus controller 4 determines whether the relay broadcasting of the professional baseball game via the back broadcast (i.e., via the radio broadcast) is ended. When the relay broadcasting of the professional baseball game via the back broadcast is not ended (Step S330: NO), the sequence returns to Step S310, where the determination is repeated as to whether the reception state of the TV broadcast is recovered.

In addition, when the relay broadcasting of the professional baseball game via the back broadcast is ended (Step S330: YES), the sequence proceeds to Step S340. At Step S340, the viewing or listening period of time for the professional baseball team participating in the game in the professional baseball game of which the relay broadcasting is viewed or listened to (i.e., the period of time from the start to the end of the relay broadcasting of the professional baseball game) is recorded in the viewing or listening baseball team database 35.

When the reception state of the front broadcast (i.e., the TV broadcast) is recovered (Step S310: YES), the sequence proceeds to Step S320, where the in-apparatus controller 4 newly selects the relay broadcasting of the professional baseball game via the front broadcast (i.e., the TV broadcast). Thereby, the relay broadcasting of the professional baseball game via the TV broadcast is outputted from the speaker 18 via the audio amplifier 17, while the image is displayed in the display unit 10. Then, the sequence returns to Step S260; thereafter, the control is performed as mentioned above.

In addition, when the ACC switch is turned into OFF state by the user who is viewing or listening to the relay broadcasting of the professional baseball game via the TV broadcast or the radio broadcast, the sequence proceeds to Step S340. At Step S340, the viewing or listening period of time for the professional baseball team participating in the game in the professional baseball game of which the relay broadcasting is viewed or listened to (i.e., the period of time from the start to the end of the relay broadcasting of the professional baseball game) is recorded in the viewing or listening baseball team database 35.

The other configuration of the second embodiment except the mentioned above is the same as that of the first embodiment. Therefore, the second embodiment provides the almost same advantage as the first embodiment does. In particular, in the second embodiment, in cases that the relay broadcasting of the professional baseball game of the team of interest to the user when the ACC switch is turned into ON state, the in-apparatus controller 4 automatically tunes into the broadcast which is performing the relay broadcasting of the professional baseball game so as to enable the user to view or listen to the relay broadcasting of the professional baseball game. This provides a configuration with a sufficient usability for the user. In addition, when a relay broadcasting of a professional baseball game of the team of interest to the user is started after the ACC switch is turned into ON state, such a broadcasting station performing a relay broadcasting of the professional baseball game is automatically selected so as to allow the relay broadcasting of the professional baseball game to be viewed or listened after the start. This provides a configuration with sufficient usability for the user.

In addition, in the second embodiment, when a relay broadcasting of a professional baseball game of the team of interest to the user is not performed when the ACC switch is turned into ON state, the broadcast or DVD (or CD) performed when the ACC switch is turned into OFF state can be viewed or listened. This provides a configuration with a sufficient usability in consideration of the preference or the intention of the user.

Further, in the above embodiments, the present disclosure is applied to the TV broadcast or the radio broadcast performing a relay broadcasting of a professional baseball game. Without need to be limited thereto, the present disclosure may be applied to a TV broadcast or a radio broadcast performing a relay broadcasting of any other sports game.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. An in-vehicle broadcast reception apparatus enabled to receive a plurality of broadcasts, comprising:
a viewing or listening determiner section configured to determine whether a relay broadcasting of a sports game is being viewed or listened to via a first broadcast on a first broadcast station;
a team determiner section configured to determine whether a team participating in the sports game of which the relay broadcasting is viewed or listened to via the first broadcast is a team of interest to a user among a plurality of teams by calculating (i) an accumulative viewing or listening count, (ii) an accumulative viewing or listening period of time, and (iii) an average viewing or listening period of time, for each team of the plurality of teams;
a retriever section configured to retrieve a second broadcast on a second broadcast station that performs a relay broadcasting of a sports game which is identical to the relay broadcasting of the sports game which is being viewed or listened to via the first broadcast on the first station; and
a switcher section configured
in response to the team determining section determining that the team participating in the sports game is the team of interest to the user, to switch from the first broadcast on the first station to the second broadcast on the second station and to output the second broadcast to enable continued viewing or listening of the relay broadcasting of the sports game when the relay broadcasting of the sports game via the first broadcast on the first station is ended, and
in response to the team determiner section determining that the team participating in the sports game is not the team of interest to the user, to continue selecting the first station to enable the first station to be continuously viewed or listened to when the relay broadcasting of the sports game via the first broadcast on the first station is ended.

2. The in-vehicle broadcast reception apparatus according to claim 1, further comprising:
a viewing or listening information database configured to record (i) the accumulative viewing or listing count, (ii) the accumulative viewing or listening period of time, and (iii) the average viewing or listening period of time, with respect to each of the plurality of teams,
wherein
the team determiner section is further configured to determine whether the team participating in the sports game of which the relay broadcasting via the first broadcast on the first broadcast station is being viewed or listened to is the team of interest to the user based on the viewing or listening information database.

3. The in-vehicle broadcast reception apparatus according to claim 1, wherein:
the relay broadcasting of the sports game is a relay broadcasting of a professional baseball game;
each of the teams is a professional baseball team;
the first broadcast is a TV broadcast; and
the second broadcast is a radio broadcast.

4. An in-vehicle broadcast reception apparatus enabled to receive a plurality of broadcasting stations, comprising:
a controller configured
to identify a team participating in a sports game of which a relay broadcasting is being viewed or listened to by a user among a plurality of teams, to calculate, as viewing or listening information of the identified team, (i) an accumulative viewing or listening count, (ii) an accumulative viewing or listening period of time, and (iii) an average viewing or listening period of time, and to store the calculated viewing or listening information of the identified team in a database, and to identify a team of interest to the user based on the database;

a broadcasting station retriever section configured to retrieve a first broadcasting station that performs a relay broadcasting of a sports game of the team of the interest to the user based on the database; and a station selector section configured to select the first broadcasting station when the relay broadcasting of the sports game of the team of interest to the user is started via the first broadcasting station, wherein the station selector section automatically selects the first broadcasting station in response to the relay broadcasting of the sports game of the team of interest to the user being performed by the first broadcasting station when a power to the in-vehicle broadcast reception apparatus is turned to an ON state, and wherein the station selector section automatically selects the first broadcasting station in response to the relay broadcasting of the sports game of the team of interest to the user being started after the power to the in-vehicle broadcast reception apparatus is turned to the ON state, and wherein the station selection automatically switches from the first broadcasting station to a second broadcasting station in response to the relay broadcasting of the sports game of the team of interest to the user being performed on the first broadcast station ending, to enable a continued relay broadcasting of the sports game of the team of interest to the user on the second broadcast station.

5. The in-vehicle broadcast reception apparatus according to claim 4, wherein the station selector section selects the first broadcasting station in response to that the relay broadcasting of the sports game of the team of interest to the user is being performed by the first broadcasting station when a power is turned into ON state.

6. The in-vehicle broadcast reception apparatus according to claim 4, wherein:

the broadcasting station retriever section is further configured to retrieve the second broadcasting station that performs the continued relay broadcasting of the sport game of the team of interest to the user.

7. The in-vehicle broadcast reception apparatus according to claim 4, wherein:

the broadcasting station retriever section is further configured to retrieve the second broadcasting station that performs the continued relay broadcasting of the sport game of the team of interest to the user; and in response to a reception state of the relay broadcasting of the sports game by the first broadcasting station being bad, the station selector section switches to the second broadcasting station to enable the continued relay broadcasting of the sports game of the team of interest to the user.

8. The in-vehicle broadcast reception apparatus according to claim 4, wherein:

the relay broadcasting of the sports game is a of the team of interest to the user and the continued relay broadcasting of the sports game of the team of interest to the user are relay broadcastings of a professional baseball game;

the first broadcasting station is a broadcasting station that performs a TV broadcast; and the second broadcasting station is a broadcasting station that performs a radio broadcast.

9. The in-vehicle broadcast reception apparatus according to claim 7, wherein in response to the reception state of the relay broadcasting of the sports game by the first broadcasting station recovering from bad to good, the station selector section switches from the second broadcasting station to the first broadcasting station to continue the relay broadcasting of the sports game of the team of interest to the user via the first broadcasting station.

10. An in-vehicle broadcast reception apparatus for receiving a plurality of relay broadcasts, the in-vehicle broadcast reception apparatus comprising:

a controller configured to determine whether a first relay broadcast of a sports game is being viewed or listened to via a first broadcast station;

to determine whether a team participating in the sports game of the first relay broadcast is a team of interest to a user by calculating (i) an accumulative viewing or listening count, (ii) an accumulative viewing or listening period, and (iii) an average viewing or listening period of time for the team participating in the sport game; and to retrieve a second relay broadcast of the sports game on a second station, wherein in response to determining that the team participating in the sports game is the team of interest to the user, the controller is further configured to switch from the first relay broadcast on the first broadcast station to the second relay broadcast of the sports game on the second broadcast station and to output the second relay broadcast to enable continued viewing or listening of the sports game when the first relay broadcast of the sports game on the first broadcast station is ended, and wherein in response to determining that the team participating in the sports game is not the team of interest to the user, the controller is further configured to output a third relay broadcast from the first broadcast station for viewing or listening after the first relay broadcast of the sports game has ended, and wherein the controller is further configured to select the team of interest to the user from among a plurality of teams, and wherein the sports game of the second relay broadcast on the second broadcast station is identical to the sports game of the first relay broadcast on the first broadcast station.

\* \* \* \* \*